United States Patent Office 3,455,959
Patented July 15, 1969

3,455,959
PRODUCTION OF CHROMANES
Hans J. Mayer, Allschwil, Rudolf Ruegg, Bottmingen, and Peter Schudel, Grut, Gossau, Switzerland, assignors to Hoffmann-La Roche Inc., Nutley, N.J., a corporation of New Jersey
No Drawing. Filed Sept. 21, 1966, Ser. No. 580,877
Claims priority, application Switzerland, Oct. 12, 1965, 14,049/65
Int. Cl. C07d 7/00, 7/18, 7/22
U.S. Cl. 260—345.5   5 Claims

ABSTRACT OF THE DISCLOSURE

Chromane compounds having the absolute configuration [2R,4'R,8'R] are produced by acidic cyclization of benzoquinone starting materials having the same configuration. The products have the same configuration and vitamin E activity as natural α-tocopherol.

---

This invention relates, in general, to a novel process for the production of chromane compounds. More particularly, the invention relates to a method for producing tocopherols and tocopherol derivatives.

The chromane compounds which are produced in the practice of this invention are tocopherols and tocopherol derivatives having the general formula

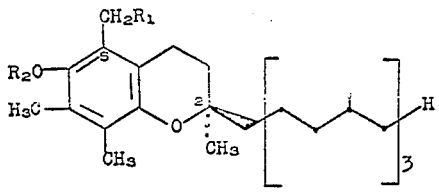

in which the symbol $R_1$ represents hydrogen or halogen atom and in which the symbol $R_2$ represents hydrogen or an acyl group.

In its preferred embodiment, the invention provides an improved process for the synthesis of the so-called natural d-α-tocopherol. According to the system of Cahn et al., reported in Experientia, 12 (1956) page 81, d-α-tocopherol has the absolute configuration [2R,4'R,8'R]. Formula I depicts the steric arrangement of the substituents which are located at the asymmetric carbon atom in the two-position.

However, although the process of this invention serves primarily as a means for obtaining the valuable d-α-tocopherol, it is useful in the production of those compounds of Formula I in which the substituent which is represented by the symbol $R_1$ is a halogen atom, particularly a chlorine atom, and in which the substituent which is represented by the symbol $R_2$ is an acyl residue, preferably a lower alkanoyl residue having up to 4 carbon atoms, such as, an acetyl or propionyl radical.

It is well known in the art that, quantitatively, the various tocopherols which occur in nature have varying degrees of vitamin E activity. For example, if the vitamin E activity of natural [2R,4'R,8'R]-α-tocopherol is assigned the value of 100, the vitamin E activity of d-β-tocopherol, relative to that of [2R,4'R,8'R]-α-tocopherol, is 15. Similarly, the vitamin E activity of d-γ-tocopherol and d-δ-tocopherol in relation to that of [2R,4'R,8'R]-α-tocopherol, is 3 and 2, respectively. Due to such differences in vitamin E activity, various researchers have devised methods designed to convert the less active tocopherol compounds into the highly active α-tocopherol. For the most part, the methods of the prior art leave much to be desired. The methods, described in the literature, in which hydroquinone derivatives, obtained from tocopherols by ring opening, are methylated and subsequently cyclized, yield a mixture of two epimers with different vitamin E activity, namely, [2R,4'R,8'R]-α-tocopherol in an amount of about 41% and [2S,4'R,8'R]-α-tocopherol in an amount of about 59%. As has been determined on the basis of acetates corresponding to α-tocopherols, the vitamin E activity of [2RS,4'R,8'R]-α-tocopheryl acetate is 73; the vitamin E activity of [2R,4'R,8'R]-α-tocopheryl acetate is 100; and the vitamin E activity of [2S,4'R,8'R]-α-tocopheryl acetate is 42. The method by which the epimer mixture is separated into its components and the process for the isolation of the highly active [2R,4'R,8'R]-α-tocopherol is difficult to carry out and, from a commercial standpoint, highly uneconomical.

In the practice of this invention, α-tocopherylquinone, that is, 2-([3R,7R,11R]-3,7,11,15-tetramethyl-3-hydroxyhexadecyl)-trimethyl-p-benzoquinone, which exists in the configuration of natural α-tocopherol, is cyclized into [2R,4'R,8'R]-α-tocopherol with a vitamin E retention of over 90%. The process is particularly characterized in that the cyclization of α-tocopherylquinone is carried out in the presence of an acidic cyclization agent.

As the acidic cyclization agent, there can be used a mineral acid, for example, sulfuric acid, phosphoric acid, etc.; or a lower alkanoic acid halide, i.e. lower alkanoyl halide, such as, acetyl chloride, propionyl chloride, etc. Where a lower alkanoyl halide is used, acetyl chloride is preferably employed. In the process, where a mineral acid is used, the cyclization step is preferably carried out in the presence of a suitable solvent. As the solvent, there can be employed, for example, a lower alkanol, such as, methanol, ethanol, isopropanol, etc. Where, however, a lower alkanoyl halide is used, it is also suitable to carry out the cyclization without the addition of a solvent.

When the cyclization is carried out using a mineral acid, there is obtained directly [2R,4'R,8'R]-α-tocopherol. When, however, an alkanoyl halide is used, there is produced a chromane derivative which is substituted in the 5-position by a halomethyl residue and in the 6-position by an acyloxy group. Such compound can be converted in a known manner, for example by reduction, into the corresponding tocopheryl ester. In turn, the tocopheryl ester can be converted, if desired, into [2R,4'R,8'R]-α-tocopherol in a known manner, for example, by saponification.

The temperature at which the cyclization is carried out is variable. For example, the reaction can be carried out at a temperature within the range of from about 0° C. to 40° C. In the preferred practice of the invention, however, cyclization is effected at the temperature of around room temperature.

The chromane derivatives which are produced in the practice of this invention, particularly [2R,4'R,8'R]-α-tocopheryl acetate and [2R,4'R,8'R]-α-tocopherol, are characterized by their high vitamin E activity. As such, they can be employed for all prior art uses of vitamin E. For example, the compounds are used as supplements for foods and feeds and as antioxidants. The manner in which the compounds are employed for such uses are conventional and will be readily apparent to persons skilled in the art.

For a fuller understanding of the nature and objects of this invention, reference may be had to the following examples which are given merely as further illustrations of the invention and are not to be construed in a limiting sense.

Example 1

In this example, 5.0 grams of α-tocopherylquinone were dissolved in 250 ml. of absolute methanol. At a temperature of about 0° C., 75 ml. of concentrated sulfuric acid and, subsequently, 125 ml. of a mixture (3:7) of sulfuric acid and ethyl ether were added thereto. After about five minutes, the reaction mixture was extracted with ether. The lypophilic phase was washed three times with water, dried over sodium sulfate and evaporated. The residue, which remained after the evaporation step was completed, was taken up in a small portion of ether, chromatographed on an aluminum oxide column [activity I (acidic) deactivated with 6% water] and eluted with petroleum ether, boiling range of 40° C. to 45° C. containing about 3% of ethyl ether.

The eluates were evaporated to obtain [2R,4′R,8′R]-α-tocopherol in the form of a pale-brown oil; U.V. adsorption spectrum (in rectified spirits): $\lambda_{max.}=292$ m$\mu$;

$$E^{1\%}_{1\,cm.}=68.5$$

$K_3Fe(CN)_6$-oxidation product; $[\alpha]_D^{25}=+21°$ ($c=1.54$, isooctane).

Example 2

11.0 grams of α-tocopherylquinone were dissolved in 55 ml. of acetyl chloride and the solution, thus obtained, was maintained at room temperature for a period of about sixteen hours. At the end of that period of time, the reaction mixture was poured on ice and extracted with ether. The lipophilic phase was washed six times with water, following which it was dried over sodium sulfate and evaporated.

There was, thus obtained, 5-chloromethyl-γ-tocopheryl acetate in the form of an oil which was crystallized from methanol. U.V. adsorption spectrum (in rectified spirits): $\lambda_{max.}=294$ m$\mu$;

$$E^{1\%}_{1\,cm.}=53$$

Example 3

In this example, a mixture of 4.0 grams if 5-chloromethyl-γ-tocopheryl acetate, produced as described in Example 2, 80.0 ml. of petroleum ether, having a boiling range of from 80° C. to 105° C., and 65 ml. of concentrated hydrochloric acid was first prepared. The mixture was then treated, in a portionwise fashion with stirring at a temperature of 50° C., with 12.0 grams of zinc dust. The reaction mixture was stirred at a temperature of about 50° C. for a period of about seven hours. At the end of that period of time, the reaction mixture was cooled and extracted with ether. The lipophilic phase was washed three times with water and evaporated. The residue was taken up in a small amount of ethyl ether, chromatographed on aluminum oxide column (activity III, neutral) and eluted with petroleum ether having a boiling range of 60° C. to 90° C. and which contained 5% of ethyl ether.

The eluates were evaporated to obtain [2R,4′R,8′R]-α-tocopheryl acetate in the form of a pale yellow oil. U.V. adsorption spectrum (in rectified spirits): $\lambda_{max.}=278, 284$ m$\mu$;

$$E^{1\%}_{1\,cm.}=38, 43$$

The [2R,4′R,8′R]-α-tocopheryl acetate, produced as described in the preceding paragraphs of this example, was saponified (e.g. by treatment of a solution of 3.0 g. of the acetate in 30 ml. of isopropanol with 12 ml. of a 10% solution of potassium hydroxide in methanol at room temperature) to obtain [2R,4′R,8′R]-α-tocopherol. U.V. adsorption spectrum (in rectified spirits): $\lambda_{max.}=292$ m$\mu$;

$$E^{1\%}_{1\,cm.}=71$$

$K_3Fe(CN)_6$-oxidation product: $[\alpha]_D^{25}=+17°$ ($c=1.59$, isooctane).

We claim:
1. A process for producing a chromane derivative having the formula

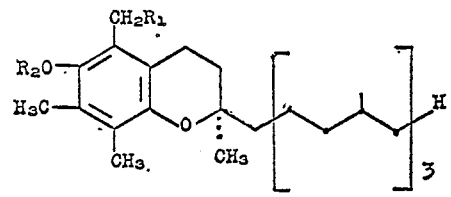

in which the symbol $R_1$ represents a member selected from the group consisting of hyddogen and a halogen atom and in which the symbol $R_2$ represents a member selected from the group consisting of hydrogen or an acyl radical which comprises cyclizing 2-([3R,7R,11R]-3,7,11,15-tetramethyl-3-hydroxyhexadecyl)-trimethyl-6-benzoquinone by contacting said compound with an acidic cyclization agent at a temperature within the range of from about 0° C. to 40° C.

2. The process of claim 1 wherein the acidic cyclization agent is a lower alkanoic acid halide.

3. The process of claim 1 wherein the acidic cyclization agent is mineral acid and wherein the cyclization is carried out in an alkanol.

4. The process of claim 2 wherein the alkanoic acid halide employed is acetyl chloride.

5. The process of claim 3 wherein the mineral acid employed is sulfuric acid and wherein the cyclization is carried out in methanol.

References Cited

UNITED STATES PATENTS

| | | | |
|---|---|---|---|
| 3,064,012 | 11/1962 | Folkers et al. | 260—345.5 |
| 3,118,914 | 1/1964 | Gloor et al. | 260—345.5 XR |
| 3,364,234 | 1/1968 | Schoenewaldt | 260—345.5 |

HENRY R. JILES, Primary Examiner.

JOHN M. FORD, Assistant Examiner.

UNITED STATES PATENT OFFICE
CERTIFICATE OF CORRECTION

Patent No. 3,455,959      Dated July 15, 1969

Inventor(s) Hans J. Mayer, Rudolf Ruegg and Peter Schudel

It is certified that error appears in the above-identified patent and that said Letters Patent are hereby corrected as shown below:

Column 1, lines 29 - 38, insert in right margin after formula:
I

Column 3, line 37, "if" should be:
of

Column 4, line 20, claim 1,

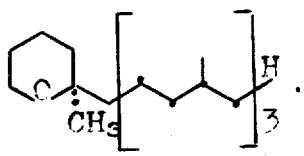

should be:

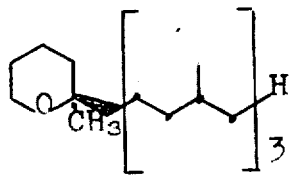

Column 4, line 27, "hyddogen" should be:
hydrogen

Column 4, line 32, "-6-benzoquinone" should be:
p-benzoquinone

SIGNED AND
SEALED
MAY 5 1970

(SEAL)
Attest:

Edward M. Fletcher, Jr.
Attesting Officer

WILLIAM E. SCHUYLER, JR.
Commissioner of Patents